United States Patent
Robinson et al.

(10) Patent No.: US 6,409,221 B1
(45) Date of Patent: Jun. 25, 2002

(54) QUICK LOCKING PIPE JOINT FOR ROUND, PLAIN, OR PROFILED PIPE

(75) Inventors: Michael I. Robinson, Mountlake Terrace; Thomas G. Bumala, Lake Forest Park, both of WA (US)

(73) Assignee: Phoenix Geometrix, LLC, Mountlake Terrace, WA (US)

( * ) Notice: Subject to any disclaimer, the term of this patent is extended or adjusted under 35 U.S.C. 154(b) by 0 days.

(21) Appl. No.: 09/591,924

(22) Filed: Jun. 12, 2000

Related U.S. Application Data (60) Provisional application No. 60/139,910, filed on Jun. 17, 1999.

(51) Int. Cl.$^7$ ............................................. F16L 55/00
(52) U.S. Cl. .......................................... 285/91; 285/360
(58) Field of Search .................... 285/91, 260, 307, 285/330, 331, 360, 401, 913

(56) References Cited

U.S. PATENT DOCUMENTS

| | | | |
|---|---|---|---|
| 25,117 A | 8/1859 | Heneage | |
| 74,950 A | 2/1868 | Steger | |
| 437,915 A | * 10/1890 | Costigan | ...................... 285/401 |
| 643,358 A | 2/1900 | Konold | |
| 813,792 A | * 2/1906 | Gooch et al. | ........... 285/360 X |
| 2,926,028 A | 2/1960 | Hookings et al. | |
| 3,189,372 A | * 6/1965 | Johnson | ........................ 285/91 |
| 4,878,695 A | * 11/1989 | Whitman | .............. 285/292.1 X |
| 5,015,014 A | 5/1991 | Sweeney | |
| 5,029,904 A | 7/1991 | Hunt | |
| 5,176,406 A | 1/1993 | Straghan | |
| 5,188,399 A | * 2/1993 | Durina | .................... 285/330 X |
| 5,290,974 A | 3/1994 | Douglas et al. | |
| 5,314,024 A | 5/1994 | Rodgers et al. | |
| 5,662,360 A | 9/1997 | Guzowski | |
| 5,769,460 A | 6/1998 | Imai | |
| 5,875,976 A | 3/1999 | Nelson et al. | |
| 5,906,398 A | 5/1999 | Larsen et al. | |
| 5,915,738 A | 6/1999 | Guest | |
| 5,921,591 A | 7/1999 | Argent | |
| 6,092,844 A | 7/2000 | Lee | |

FOREIGN PATENT DOCUMENTS

| | | | |
|---|---|---|---|
| FR | 961165 | * 5/1950 | ................. 285/401 |

* cited by examiner

Primary Examiner—Greg Binda
(74) Attorney, Agent, or Firm—Christensen O'Connor; Johnson Kindness PLLC (57) ABSTRACT

A joint for joining pipes, wherein the joint employs offset, overlapping locking tabs on a male and a female joint member, which locking tabs are spaced to permit the locking tabs on the female joint member to slide past the locking tabs on the male joint member. The joint members are then rotated to lock the joint axially. A locking pin and locking pin aperture lock the joint rotationally, when the locking tabs are aligned. The locking pin is rotatable, and has a chamfered portion whereby the female joint member can slide over the locking pin to engage the locking pin. To disassemble the joint, the locking pin is rotated ninety degrees to orient the chamfered portion circumferentially, whereby the joint members may be rotated, permitting the female joint member to slide over the locking pin.

16 Claims, 6 Drawing Sheets

QUICK LOCKING PIPE JOINT FOR ROUND, PLAIN, OR PROFILED PIPE

CROSS REFERENCE TO RELATED APPLICATIONS

This application claims the benefit of provisional patent Application No. 60/139,910, filed Jun. 17, 1999, the benefit of which is hereby claimed under 35 U.S.C. § 119.

FIELD OF THE INVENTION

This invention relates to apparatus for joining pipes, and in particular, to piping joints that are indexable and that can be disassembled.

BACKGROUND OF THE INVENTION

Pipes and piping systems are useful in a wide variety of applications. Piping systems for transporting or routing solids, liquids and gasses, for example, are virtually ubiquitous throughout home and industry. When installing a piping system, individual pipes are typically acquired, in set lengths, and must be assembled by cutting and joining the pipes to produce the desired piping configuration. Different applications may present different pipe joint requirements. In most applications it is important that the pipe joints be strong, so that they do not become a failure point for the piping system. This is particularly important when the joints are not easily accessible. In some applications, easy disassembly of the piping joint is desirable, for example in applications where the piping system is temporary and will ultimately be removed, or in order to accommodate difficulties that might be encountered during field assembly. Also, in many applications it is important that the pipe joints be sealed, either to prevent whatever is in the piping system from leaking out, or to prevent external fluids from leaking into the pipe system, or both.

It is sometimes desirable to have a pipe joint that will rotationally index the pipes being joined. For example, inclinometers are frequently used in geological applications to detect movement of a hillside or other geologic formation. Inclinometers measure inclination relative to the vertical axis, and periodic measurements taken along a conduit installed in the ground can be compared to detect changes. Typically a plastic pipe conduit is installed in a bore hole in a generally vertical orientation. The plastic pipe conduit includes oppositely disposed longitudinal grooves along its inner surface that provide a track for the inclinometer, which records inclination while being lowered through the plastic conduit. Because the profiled pipe conduit is constructed by joining a number of separate pipes, the individual pipes must be rotationally aligned, or indexed, so that the longitudinal grooves in the profiled pipes form a continuous track along the length of the pipe conduit.

Many different systems have been developed to facilitate assembling and joining pipes, which systems may be more or less suitable for any given application. For example, home water systems employing copper piping is typically installed using sleeve joint elements that are soldered to the pipe. This produces a strong, reliable and generally permanent pipe joint. Home irrigation systems, on the other hand, typically employ plastic piping that is joined using male and female joint elements that are glued together. This type of piping system is very flexible, easily installed and relatively inexpensive. Neither of these methods allow for easy disassembly of the piping joints.

A threaded joint for tubular plastic parts is disclosed in U.S. Pat. No. 5,906,398 to Larsen et al. Larsen et al. teaches the use of helical threads wherein at least one of the threads terminates abruptly, creating a transverse end-surface that can be located at a predetermined position. This end-surface functions as a stop, whereby the pipes are rotationally oriented in a desired manner when the joint elements are fully screwed together. It may be difficult, however, to control the fabrication of threads well enough to achieve precise rotational control over the joined pipes. In addition, difficulties may arise in field applications where dirt and other foreign matter may interfere with the threaded joint, or may prevent the joint from fully closing thereby failing to accomplish the desired rotational orientation.

In U.S. Pat. No. 5,015,014 to Sweeney, a plastic pipe section is disclosed wherein matching internal and external rabbets are formed on the pipes to be joined, and the pipes are pressed together. An optional clamp may be installed around the joint to help strengthen the joint. This type of joint, which relies on the flexibility of the pipe to allow the interlocking ribs to pass each other, may not provide a sufficiently strong joint for certain applications. Also, the force required to join the pipes in interlocking fashion may make assembly difficult or require special tools, and dirt encountered in the field may interfere with assembly of the joint.

U.S. Pat. No. 5,915,738 to Guest and U.S. Pat. No. 5,029,904 to Hunt both disclose pipe joints wherein one pipe is provided with a circumferential ridge and the mating pipe is provided with a mating cup or fingers having a lip that engages the circumferential rib to hold the pipes together. These types of joints may not provide sufficient strength for certain applications, and result in a joint having a diameter greater than the diameter of the pipe, which may be undesirable.

In U.S. Pat. No. 5,176,406 to Straghan, a pipe coupling is disclosed for joining pipes in end-abutting relation comprising a sleeve having outwardly deflectable segments that engage circumferential grooves on each of the pipes. In addition, an additional slot is provided on the coupling member to engage a raised button provided on the pipes, thereby allowing the pipes to be rotationally aligned in a predetermined orientation. Joints of this type may not be strong enough for certain applications, and the joint will have a larger diameter than the pipes. The joint is also difficult to disassemble. The slot is also susceptible to being clogged by dirt and other foreign matter encountered in the field, interfering with pipe assembly. Also, the longitudinal slots at the joint will weaken the torsional rigidity of the joint, which could result in a weaker joint and/or rotational misalignment of the pipes.

There is a need for a strong pipe joint that is sufficiently robust to tolerate dirt that may be encountered in the field, and that can be disassembled. There is also a need for a robust pipe joint that is indexable.

SUMMARY OF THE INVENTION

The present invention is directed to a joint for connecting pipes comprising a male joint member having a plurality of outwardly-extending locking tabs at its distal end and a female joint member having a plurality of inwardly-extending locking tabs spaced between its distal and proximal ends, wherein the outwardly-extending locking tabs can slide past and then be rotated to a position behind the inwardly-extending locking tabs such that the locking tabs prevent relative axial motion between the male and female joint members. In another aspect of the invention, the joint further comprises a rotational locking apparatus that engages to prevent relative rotational motion between the male and female joint members.

According to another aspect of the invention, the rotational locking apparatus comprises a locking pin having a cylindrical portion extending outwardly from the male joint member that engages a circular aperture on the female joint member.

In one embodiment, the locking pin has a chamfered profile whereby the female joint member can more easily slide over the locking pin.

In yet another aspect of the invention, the locking tabs further comprise interlocking reverse-chamfered edges wherein the inwardly-extending locking tabs radially interlock with the outwardly-extending locking tabs.

In still another aspect of the invention, the male joint member may further comprise internal longitudinal grooves that match longitudinal grooves in the pipes that are to be connected.

In another aspect of the invention, the joint may further include an O-ring that is installable to seat between the male joint member and the female joint member.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

While the preferred embodiment of the invention has been illustrated and described, it will be appreciated that various changes can be made therein without departing from the spirit and scope of the invention.

Figure 1:
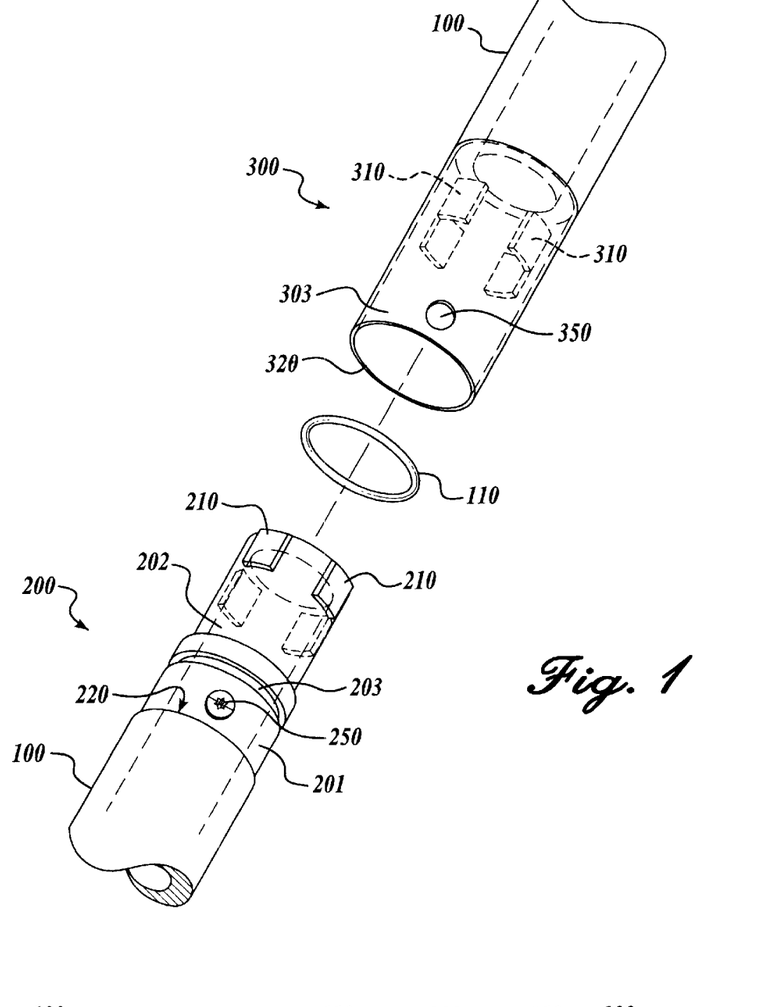
FIG. 1 is a perspective view of a disassembled pipe joint in accordance with the present invention.
Figure 11:
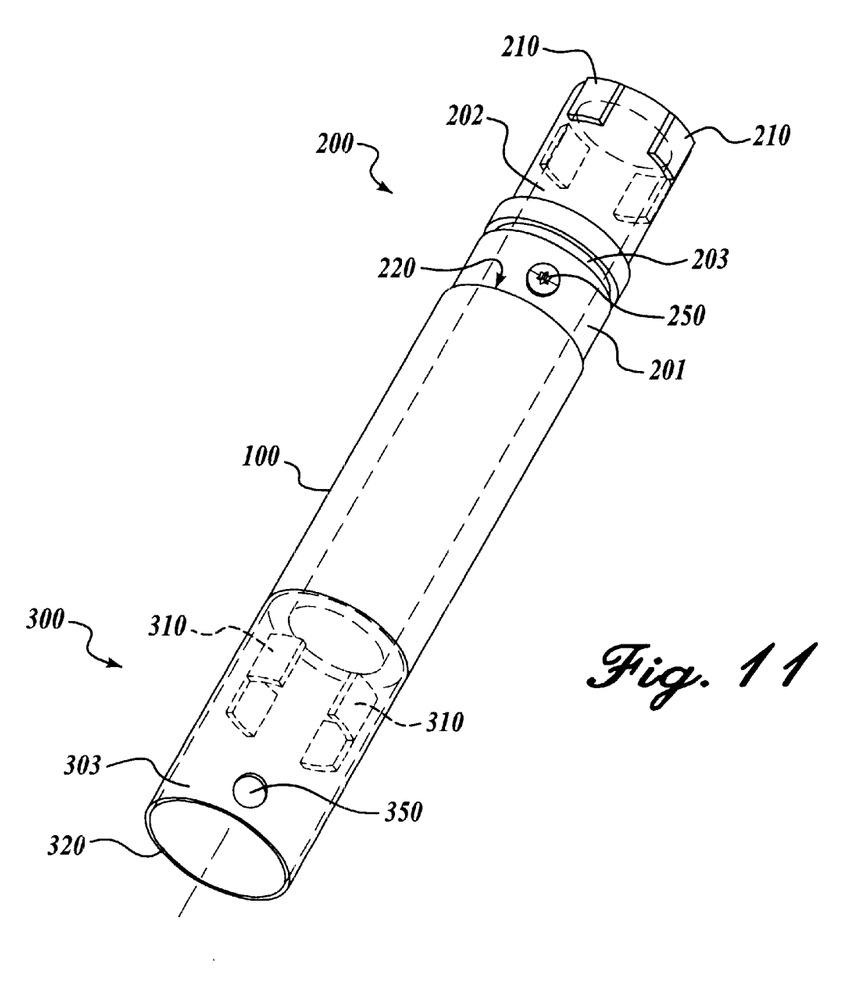
FIG. 11 is a perspective view of a single one of either of the pipes shown in FIG. 1, showing the joint members on opposite ends.

Referring now to the drawings, wherein like numbers indicate like parts, FIG. 1 is a perspective view of a disassembled pipe joint in accordance with the present invention. The joint comprises a male joint member 200 and a corresponding female joint member 300. In the disclosed embodiment, the male joint member 200 and the female joint member 300 are integrally formed on opposite ends of a pipe 100 as shown in FIG. 11. It is contemplated, however, that the present invention could also be practiced in other configurations, for example, as separate components that are attached to the ends of standard pipes.

As seen most clearly in FIG. 1, the male joint member 200 comprises a first tubular portion 201 and a second tubular portion 202. The first tubular portion 201 extends axially from the pipe 100 and has an inside diameter that matches the inside diameter of the pipe 100, and an outside diameter that is less than the outside diameter of the pipe 100. The second tubular portion 202 extends axially from the distal end of the first tubular portion 201 and has an inside diameter matching the inside diameter of the pipe 100, and an outside diameter that is less than the outside diameter of the first tubular portion 201.

Four outwardly extending locking tabs 210 project radially from the distal end of the second tubular portion 202. The locking tabs 210 are angularly spaced along a narrow axial portion of the circumference of the second tubular portion 202. Although four locking tabs are shown in the embodiment illustrated in FIG. 1, it is contemplated that more or fewer locking tabs could also be used. It is also contemplated that multiple rows of longitudinally-spaced locking tabs could alternatively be provided to produce an even stronger joint. The locking tabs 210 project outwardly to a diameter that is approximately equal to the outside diameter of the first tubular portion 201.

Figure 4:
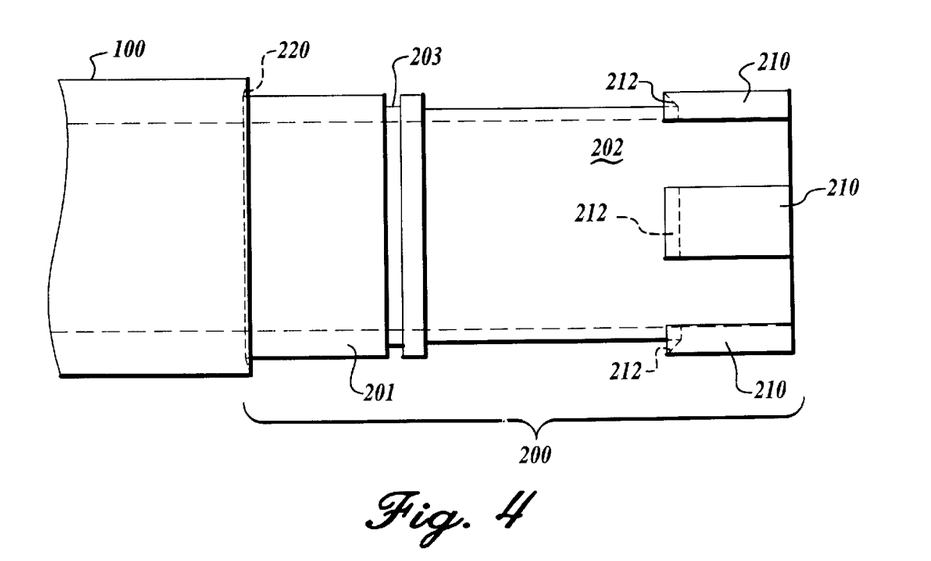
FIG. 4 is a front view of the male joint member of the pipe joint shown in FIG. 1.

As seen most clearly in FIG. 4, in the illustrated embodiment the locking tabs 210 have a back edge 212 that is reverse chamfered. The junction 220 between the pipe 100 and the male joint first tubular portion 201 is also optionally provided with a reverse chamfer. Alternatively, if the female joint member 300 must flex outwardly to accommodate a locking pin 250, the junction 220 may not be chamfered. The male joint member 200 also has a locking pin 250 rotatably mounted in the first tubular portion 201 as discussed in more detail below.

Figure 3:
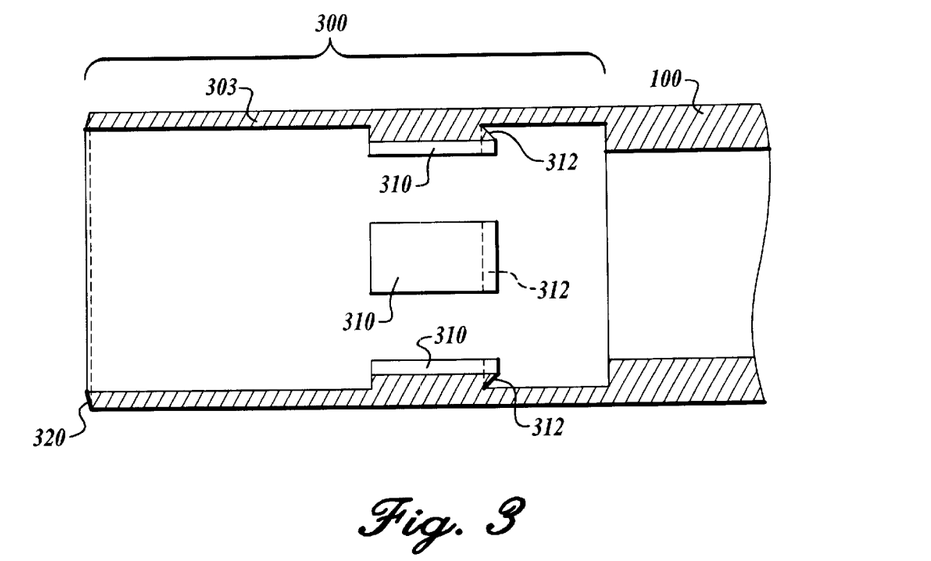
FIG. 3 is a front sectional view of the female joint member of the pipe joint shown in FIG. 1.

As seen most clearly in FIG. 3, the female joint member 300 has a third tubular portion 303 that extends axially from the pipe 100, from the pipe end opposite the male joint member 200. The third tubular portion 303 has an outside diameter generally matching the outside diameter of the pipe 100, and an inside diameter that is approximately equal to the outside diameter of the male joint first tubular portion 201. Four inwardly extending locking tabs 310 are disposed on the inner surface of the third tubular portion 303. The inwardly extending locking tabs 310 are located an axial distance from the junction between the pipe 100 and the female joint member 300 that is approximately equal to the axial length of the outwardly extending locking tabs 210 on the male joint member 200.

The inwardly extending locking tabs 310 project inwardly to a diameter that is approximately equal to the outside diameter of the second tubular portion 202. The inwardly extending locking tabs 310 have a width and are angularly spaced such that they can slidably pass between the outwardly extending locking tabs 210 when the male joint member 200 is inserted into the female joint member 300 and the joint members 200, 300 are in a first position wherein the inwardly extending locking tabs 310 are aligned with the gaps between the outwardly extending locking tabs 210.

Figure 2:
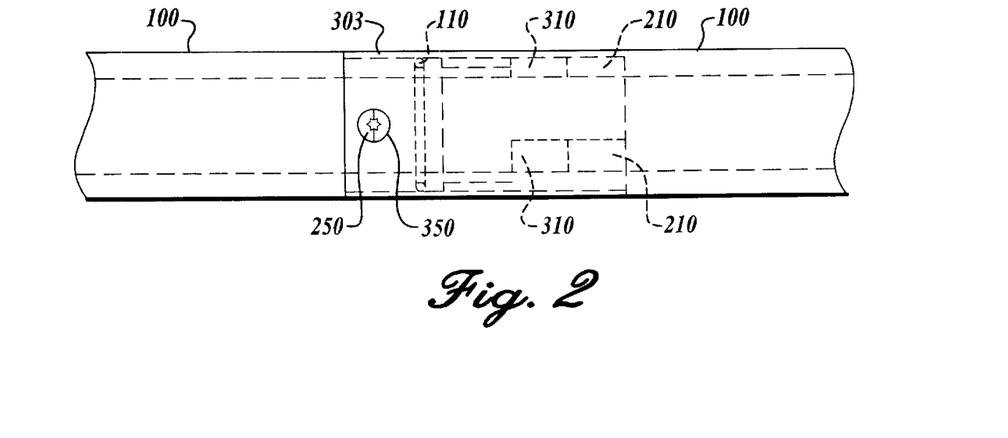
FIG. 2 is a front view of the pipe joint shown in FIG. 1, in an assembled configuration.
Figure 5:
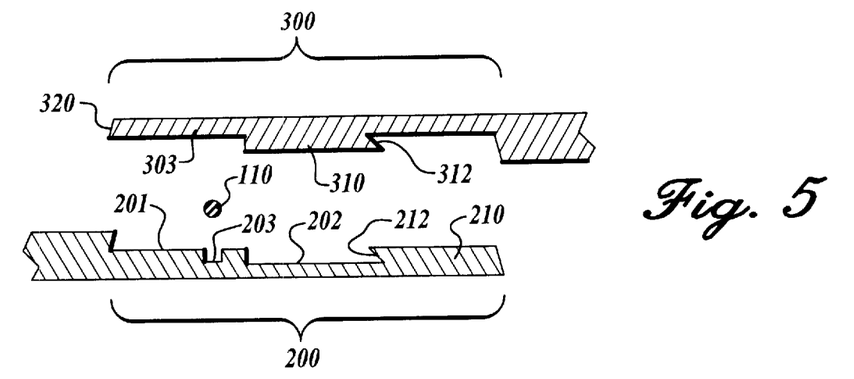
FIG. 5 is a partial, cutaway view of the male joint member and female joint member of the pipe joint shown in FIG. 1.

It will be appreciated that when the male joint member 200 is fully inserted into the female joint member 300, the joint members 200, 300 can be rotated relative to each other to a second position wherein the outwardly extending locking tabs 210 are aligned directly behind the inwardly extending locking tabs 310, as shown in FIG. 2. It will also be appreciated that the inwardly extending locking tabs 310 radially overlap the outwardly extending locking tabs 210, and that the overlapping locking tabs will thereby prevent significant relative axial motion between the joint members 200, 300. FIG. 5 shows an exploded partial sectional view of the male joint member 200 and the female joint member 300, illustrating the axial orientation of the locking tabs 210, 310 when the joint is assembled. As shown in FIGS. 1 and 2, the length of the third tubular portion 303 is preferably approximately equal to the combined length of the first tubular portion 201 and second tubular portion 202.

As seen most clearly in FIG. 3, in the illustrated embodiment the inwardly extending locking tabs 310 have a back edge 312 that is reverse chamfered. The reverse chamfer on the back edge 312 is shaped to engage the reverse chamfer on the back edge 212 of the outwardly extending locking tabs 210 when the joint members are rotated to the second position. As also seen in FIG. 3, the front edge 320 of the third tubular portion 303 may optionally be provided with a chamfer that is shaped to engage the reverse chamfer at the junction 220 between the pipe 100 and the male joint first tubular portion 201. A locking pin aperture 350 is provided through the female joint member 300 that is sized to slidably accommodate the locking pin 250 and located axially and circumferentially on the third tubular portion 303 whereby the locking pin 250 will engage the locking pin aperture 350 when the joint members 200, 300 are in the second position. It will be appreciated when the locking pin 250 engages the locking pin aperture 350, the male joint member 200 and female joint member 300 will be locked from rotating with respect to each other.

An O-ring groove 203 can optionally be provided in the first tubular portion 210 of the male joint member 200. An O-ring 110 can then be installed on the O-ring groove 203, to provide a seal between the joint members 200, 300 when the joint is assembled.

Figure 6:
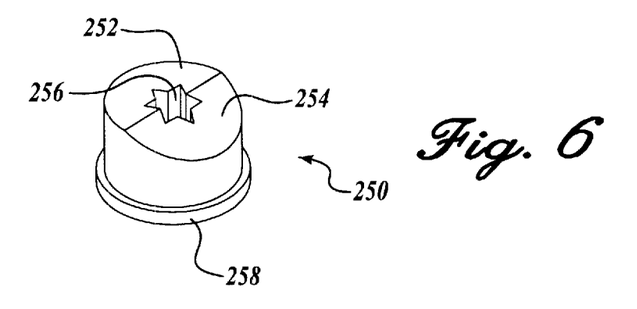
FIG. 6 is a perspective view of the locking pin component shown in FIG. 1.
Figure 7:
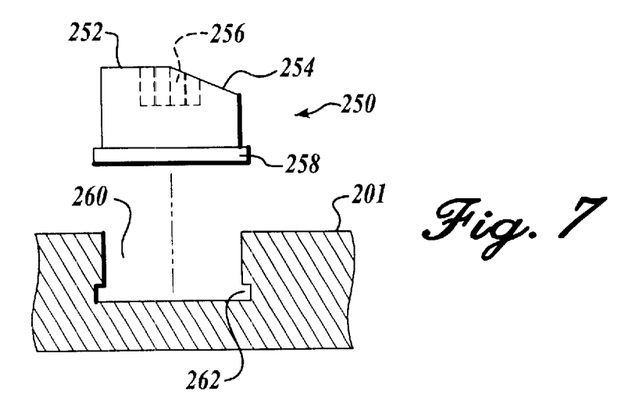
FIG. 7 is a partial exploded cutaway side view of locking pin of FIG. 6 showing also the locking pin aperture in the male joint member.

A preferred locking pin 250 is shown in FIG. 6. The locking pin 250 is generally cylindrical in shape and has an enlarged circular base portion 258. A keyed aperture 256 is provided at the top of the pin 250 generally at the axis. The top surface of the pin 250 includes a flat portion 252 and a chamfered portion 254. The locking pin 250 is rotatably mounted in the first tubular portion 201 of the male joint member 200. As seen most clearly in FIG. 7, a mounting orifice 260 is provided for the locking pin 250 in the first tubular portion 201. The mounting orifice 260 has an enlarged lower portion 262 sized to accommodate the lower portion 258 of the locking pin 250, whereby the locking pin 250 can be pressed into the mounting orifice 260, and will be retained therein by the enlarged base portion 258. It will be appreciated that the locking pin 250 can therefor be rotated axially within the mounting orifice 260, most conveniently by using a tool that engages the keyed aperture 256.

Figure 8:
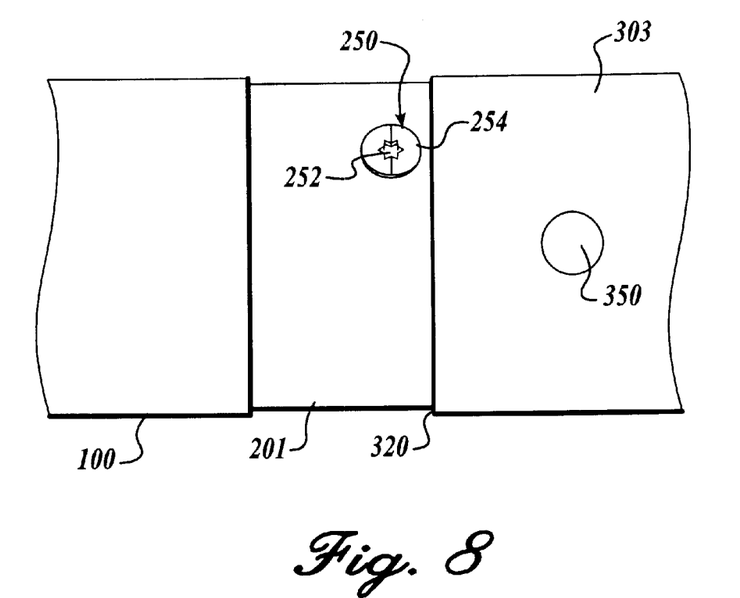
FIG. 8 is a side view of the pipe joint shown in FIG. 1, with the male joint member partially inserted into the female joint member wherein the chamfered edge of the locking pin is oriented to accommodate the female joint member.

FIG. 8 shows the configuration of the male joint member 200 and female joint member 300 partially assembled. The locking pin 250 is oriented with the chamfered portion 254 facing toward the female joint member 300, whereby the flexibility of the female joint member 300 and/or the locking pin 250 will allow the tubular portion 302 to slide up the chamfered portion 254 and over the locking pin 250. When the male joint member 200 and the female joint member 300 are rotationally oriented in the first position, as shown in FIG. 8, the outwardly extending locking tabs 210 are offset from the inwardly extending locking tabs 310 whereby the locking tabs 210, 310 can slide past each other axially. When the female joint member 300 and male joint member 200 are further pushed together such that the front edge of the female joint member 320 is adjacent the junction between the male joint member 200 and the pipe 100, the joints 200, 300 can be rotated to the second position, whereby the locking pin aperture 350 will slidably engage the locking pin 250. When the locking pin aperture 350 has engaged the locking pin 250, the outwardly extending locking tabs 210 are behind the inwardly extending locking tabs 310 and the joint is axially locked in place. The joint is also rotationally locked by the locking pin 250. It will be apparent that although the locking pin 250 also axially locks the joint, the strength of the axial support provided by the locking pin 250 and locking pin aperture 350 is less strong than the axial support from the locking tabs 210, 310.

Figure 9:
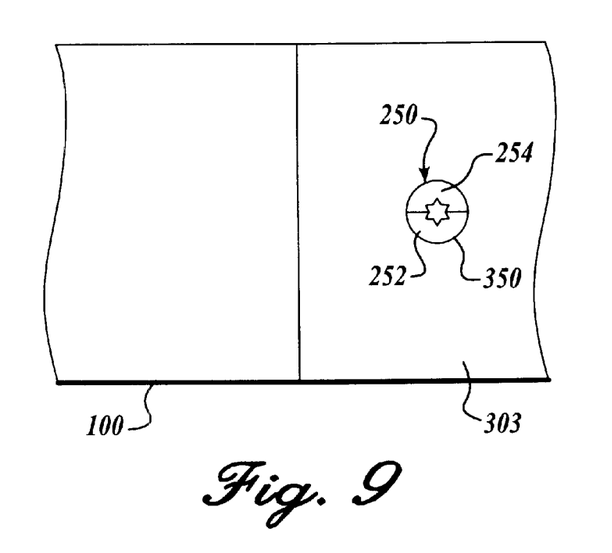
FIG. 9 is a side view of the pipe joint shown in FIG. 1, with the joint fully engaged, and with the chamfered edge of the locking pin oriented to facilitate disassembly of the joint.

FIG. 9 shows the assembled joint with the locking pin 250 rotated ninety degrees from the position shown in FIG. 8, such that the chamfered portion 254 is oriented circumferentially. This locking pin 250 orientation would be selected if the pipe joint is to be disassembled. When the locking pin 250 is oriented as shown in FIG. 9, the flexibility of the third tubular portion 303 and/or the locking pin 250 will permit the third tubular portion 303 to slide over the top of the locking pin 250, and the male joint member 200 and female joint member 300 may be rotated back to the first position, wherein the locking tabs 210, 310 are offset, and the joint members 200, 300 can be axially pulled apart to disassemble the joint.

Although the preferred embodiment of a locking pin has been disclosed, it is contemplated there are many other locking pin configurations that are alternatively acceptable for the current application. For example, rather than providing a rotatable, chamfered locking pin, a locking pin that is spring loaded in the male pipe member could be used, wherein the locking pin is simply depressed into an orifice (similar to mounting orifice 260) for assembly or disassembly of the pipe joint. Alternatively, a locking pin that is spring-loaded longitudinally could be provided on the male joint member, with a mating slot on the female joint member, wherein when the joint members are pushed together the locking pin will retract longitudinally, and then when the joints are rotated into the desired alignment, the locking pin would engage the slot in the female joint member. These, and other equivalent locking pin configurations could be used without departing from the present invention. It is also contemplated that the present invention could be practiced in applications where rotational alignment is not important, and wherein no locking pin is used.

Figure 10A:
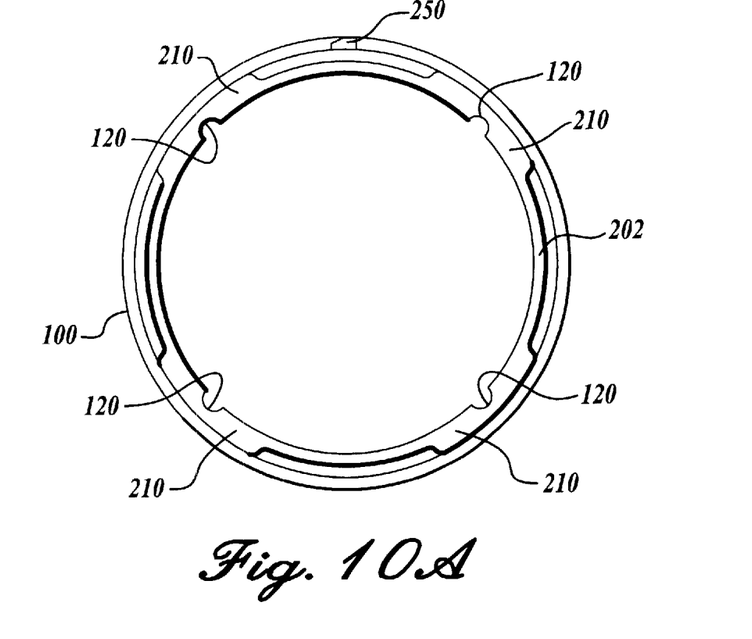
FIG. 10A is a front view of a male joint member of the present invention shown in FIG. 1, applied to the profile pipe.
Figure 10B:
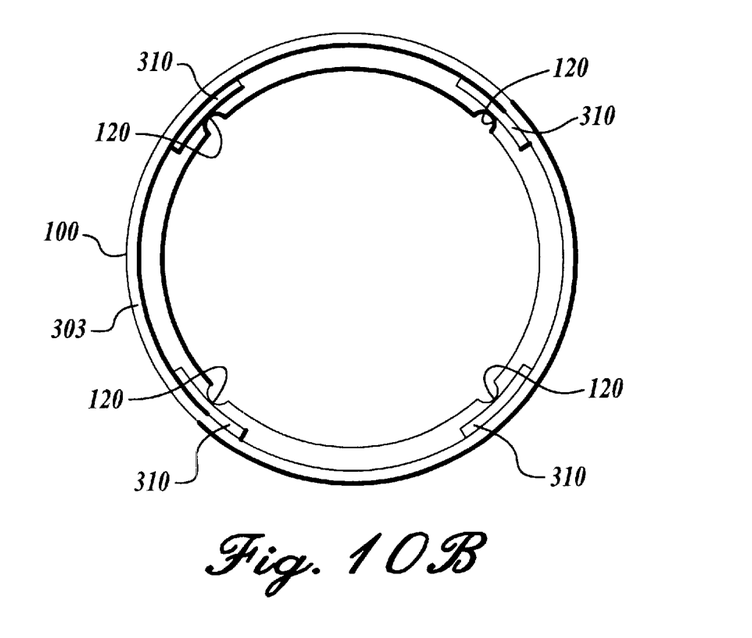
FIG. 10B is a front view of a female joint member of the present invention shown in FIG. 1, applied to a profiled pipe.

The present invention is particularly suited to applications wherein the pipe to be joined is profiled, that is, when the pipe has interior features, such as grooves, that must be properly aligned. FIGS. 10A and 10B show front views of the male joint member 200 and the female joint member 300, wherein the pipe to be joined has two pairs of oppositely disposed longitudinal internal grooves 120. The male joint member 200, which has an inside diameter matching the inside diameter of the pipe 100, also preferably continues the internal grooves 120 on the interior surface. In the disclosed embodiment, the locking tabs 210 are located directly over the grooves 120, so that the extent of the minimum wall thickness is reduced.

As will be apparent to those skilled in the art in the light of the foregoing disclosure, many alterations and modifications such as different materials, profiles, numbers of locking tabs, numbers of locking pins and the like are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. A joint for connecting a first pipe to a second pipe, said joint comprising a male joint member and a female joint member, wherein:
    said male joint member comprising cylindrical first and second tubes, said first tube having a first outer diameter, a first length, a proximal end coaxially attached to said first pipe and a distal end, said second tube having a second outer diameter less than said first outer diameter, a second length, a proximal end coaxially attached to said first tube distal end, and a distal end, said second tube further comprising a plurality of circumferentially spaced first locking tabs having an axial length and extending outwardly from said second tube adjacent said distal end, said first locking tabs having an outer diameter approximately equal to said first outer diameter;
    said female joint member comprising a cylindrical third tube having a proximal end coaxially attached to said second pipe and a distal end, said third tube having an inner diameter approximately equal to said first outer diameter and a length approximately equal to said first length plus said second length, said third tube further comprising a plurality of second locking tabs extending inwardly from said third tube and spaced circumferentially generally the same as said first locking tabs and located axially a distance from said third tube proximal end approximately equal to said first locking tabs' axial length, said second locking tabs having an inner diameter approximately equal to said second outside diameter;
    whereby said male joint member can be slidably inserted into said female joint member such that said first locking tabs slide past said second locking tabs whereupon said male joint member may be rotated relative to said female joint member to locate said first locking tabs behind said second locking tabs.

2. The joint of claim 1 wherein said joint further comprises a means for rotationally locking said male joint member to said female joint member when said first locking tabs are behind said second locking tabs.

3. The joint of claim 2 wherein said locking means comprises a locking pin having a regular cross section projecting outwardly from said first tube and an aperture in said third tube, said aperture sized to slidably engage said locking pin, and located to engage said locking pin when said first locking tabs are located behind said second locking tabs.

4. The joint of claim 3 wherein said locking pin has a chamfered portion whereby said third tube can slide over said locking pin.

5. The joint of claim 4 wherein said locking pin cross-section is circular and said locking pin is rotatably attached to said first tube whereby said locking pin can be rotated ninety degrees to orient said chamfered profile in the circumferential direction.

6. The joint of claim 5 wherein said locking pin further comprises a keyed axial aperture partway therethrough.

7. The joint of claim 2 wherein said first and second pipes have an internal profile and said male joint member further comprises an internal profile matching said pipe profile, and further wherein said locking means is located to engage when said male joint member internal profile is aligned with said pipe profile.

8. The joint of claim 7 wherein said first and second pipes have an outside diameter, and wherein said third tube portion has an outside diameter equal to said pipe outside diameter.

9. The joint of claim 1 wherein said first locking tabs have a distal end that is adjacent said second tube distal end, and a proximal end disposes away from said second tube distal end, wherein said proximal end further comprises a first reverse chamfer, and further wherein said second locking tabs have a distal end disposed toward said third tube distal end and a second proximal end disposed away from said third tube distal end, wherein said second proximal end further comprises a second reverse chamfer, such that when said male joint member engages said female joint member said first and second reverse chamfers will overlap.

10. The joint of claim 1 wherein said first tube further comprises a circumferential groove, and said joint further comprising an O-ring sized to be installed on said circumferential groove.

11. An improved profiled pipe of the type having at least one longitudinal groove therethrough, said profiled pipe having an outside diameter and an inside diameter along most of its length, the improvement comprising a female joint member on a proximal end of said profiled pipe and a complementary male joint member on a distal end of said profiled pipe, wherein:
    said female joint member comprises a first tube having an outside diameter equal to said pipe outside diameter and an inside diameter greater than said pipe inside diameter, said female joint member further comprising an annular, circumferentially intermittent inner ridge on said first tube, said intermittent inner ridge having an inside diameter that is greater than said pipe inside diameter, wherein said intermittent ridge forms at least two axial channels;
    said complementary male joint member comprises a second tube having an inside diameter equal to said pipe inside diameter and at least one longitudinal groove matching said at least one longitudinal groove in said profiled pipe, said second tube comprising a first portion having an outside diameter that is approximately equal to said first tube inside diameter, and a second portion having an outside diameter that is approximately equal to said intermittent inner ridge inside diameter, said second portion further comprising an annular, circumferentially intermittent outer ridge, said intermittent outer ridge having an outside diameter approximately equal to said first tube inside diameter, and wherein said intermittent outer ridge is intermittent in a generally complementary manner to said intermittent inner ridge;
    wherein said male joint member on a first said improved profiled pipe can be inserted into said female joint member on a second said improved profiled pipe such that said intermittent outer ridge is slidably insertable through said intermittent inner ridge, and rotated with respect to said female joint member to position said intermittent outer ridge behind said intermittent inner ridge thereby axial locking said male joint member to said female joint member.

12. The improved profiled pipe of claim 11 further comprising a means for rotationally locking said male and female joint members.

13. The improved profiled pipe of claim 12 wherein said means for rotationally locking said male and female joint members comprises a circular aperture through said first tube and a locking pin that is slidably insertable into said circular aperture projecting outwardly from said second tube, wherein said locking pin is axially located to engage said circular aperture when said male joint member is axially locked to said female joint member.

14. The improved profiled pipe of claim 13 wherein said locking pin has a chamfered profile.

15. The improved profiled pipe of claim 14 wherein said locking pin is rotatably attached to said second tube.

16. The improved profiled pipe of claim 15 wherein said locking pin further comprises a top surface having an axially disposed keyed aperture.

* * * * *

UNITED STATES PATENT AND TRADEMARK OFFICE
CERTIFICATE OF CORRECTION

PATENT NO. : 6,409,221 B1
DATED : June 25, 2002
INVENTOR(S) : M.I. Robinson et al.

It is certified that error appears in the above-identified patent and that said Letters Patent is hereby corrected as shown below:

<u>Title page,</u>
Item [74], *Attorney, Agent, or Firm* "O'Connor;" should read -- O'Connor --

<u>Column 7,</u>
Line 30, "diameter;" should read -- diameter; and --

<u>Column 8,</u>
Line 16, "disposes away" should read -- disposed away --
Line 44, "channels;" should read -- channels; and --

<u>Column 9,</u>
Line 1, "ridge thereby" should read -- ridge, thereby --

Signed and Sealed this

Twenty-first Day of January, 2003

JAMES E. ROGAN
*Director of the United States Patent and Trademark Office*